United States Patent
Stachon et al.

(10) Patent No.: US 9,075,698 B2
(45) Date of Patent: Jul. 7, 2015

(54) AUTOMATED SYSTEM FOR ANALYZING PHYTOTOXICITY

(75) Inventors: Walter Stachon, Stanton, MN (US); Karolyn A. Terpstra, Highland, IL (US)

(73) Assignee: Syngenta Participations AG, Basel (CH)

( * ) Notice: Subject to any disclaimer, the term of this patent is extended or adjusted under 35 U.S.C. 154(b) by 227 days.

(21) Appl. No.: 13/700,303

(22) PCT Filed: Feb. 21, 2011

(86) PCT No.: PCT/EP2011/052531
§ 371 (c)(1),
(2), (4) Date: Nov. 27, 2012

(87) PCT Pub. No.: WO2011/147596
PCT Pub. Date: Dec. 1, 2011

(65) Prior Publication Data
US 2013/0067808 A1 Mar. 21, 2013

Related U.S. Application Data

(60) Provisional application No. 61/349,018, filed on May 27, 2010, provisional application No. 61/373,471, filed on Aug. 13, 2010.

(30) Foreign Application Priority Data

Aug. 23, 2010 (WO) ................ PCT/US2010/046288

(51) Int. Cl.
*A01G 7/00* (2006.01)
*G06F 19/00* (2011.01)
(Continued)

(52) U.S. Cl.
CPC ........ *G06F 19/00* (2013.01); *A01G 7/00* (2013.01); *A01C 11/00* (2013.01); *A01D 45/00* (2013.01)

(58) Field of Classification Search
USPC ......... 47/58.1 R, 58.1 FV, 1.01 R, FOR. 100; 382/110; 702/2, 5, 150
See application file for complete search history.

(56) References Cited

U.S. PATENT DOCUMENTS 4,897,957 A * 2/1990 Oglevee et al. ............ 47/58.1 R
5,130,545 A   7/1992 Lussier
(Continued)

FOREIGN PATENT DOCUMENTS

DE 10002880 * 6/2001
DE 10002880 C1 6/2001
(Continued)

OTHER PUBLICATIONS

Patent Cooperation Treaty, PCT/EP2011/052531, International Search Report and Written Opinion with a mailing date Jun. 15, 2011.
(Continued)

*Primary Examiner* — Trinh Nguyen
(74) *Attorney, Agent, or Firm* — R. Kody Jones

(57) ABSTRACT

A system for evaluating the phytotoxicity and/or injury of plants is described. Plants are planted in row sections and a cart is used to pass a radiometric sensor over the row sections. The cart has a radiometric sensor assembly positioned above the row section. Each sensor assembly generates a data signal and a computer receives and stores the data signals. The field cart is positioned above the row sections and measures the existence of plants in the row section and the quantity of vegetation in the row section.

15 Claims, 19 Drawing Sheets

(51) Int. Cl.
*A01C 11/00* (2006.01)
*A01D 45/00* (2006.01)

(56) References Cited

U.S. PATENT DOCUMENTS

| | | | | |
|---|---|---|---|---|
| 5,764,819 | A | * | 6/1998 | Orr et al. ............... 382/110 |
| 5,837,997 | A | * | 11/1998 | Beck et al. ............... 250/227.11 |
| 6,160,902 | A | * | 12/2000 | Dickson et al. ............... 382/110 |
| 6,178,253 | B1 | * | 1/2001 | Hendrickson et al. ......... 382/110 |
| 6,601,341 | B2 | * | 8/2003 | Raun et al. ............... 47/58.1 R |
| 7,047,133 | B1 | * | 5/2006 | Dyer et al. ............... 702/5 |
| 7,994,802 | B2 | | 8/2011 | Osypka |
| 2001/0036295 | A1 | * | 11/2001 | Hendrickson et al. ......... 382/110 |
| 2007/0003107 | A1 | * | 1/2007 | Wei et al. ............... 382/104 |
| 2007/0044445 | A1 | * | 3/2007 | Spicer et al. ............... 56/10.1 |
| 2007/0256357 | A1 | * | 11/2007 | Shortridge et al. ............... 47/14 |
| 2009/0210119 | A1 | * | 8/2009 | Poulsen ............... 701/50 |
| 2015/0027044 | A1 | * | 1/2015 | Redden ............... 47/58.1 R |

FOREIGN PATENT DOCUMENTS

| | | | |
|---|---|---|---|
| DE | 102005050302 A1 | | 4/2007 |
| FR | 2650475 | * | 2/1991 |
| FR | 2650475 A1 | | 2/1991 |

OTHER PUBLICATIONS

Patent Cooperation Treaty, PCT/EP2011/052531, Written Opinion of the International Preliminary Examining Authority with a mailing date Jun. 1, 2012.
Patent Cooperation Treaty, PCT/EP2011/052531, International Preliminary Report on Patentability issued by the International Preliminary Examining Authority with a mailing date Aug. 29, 2012.

* cited by examiner

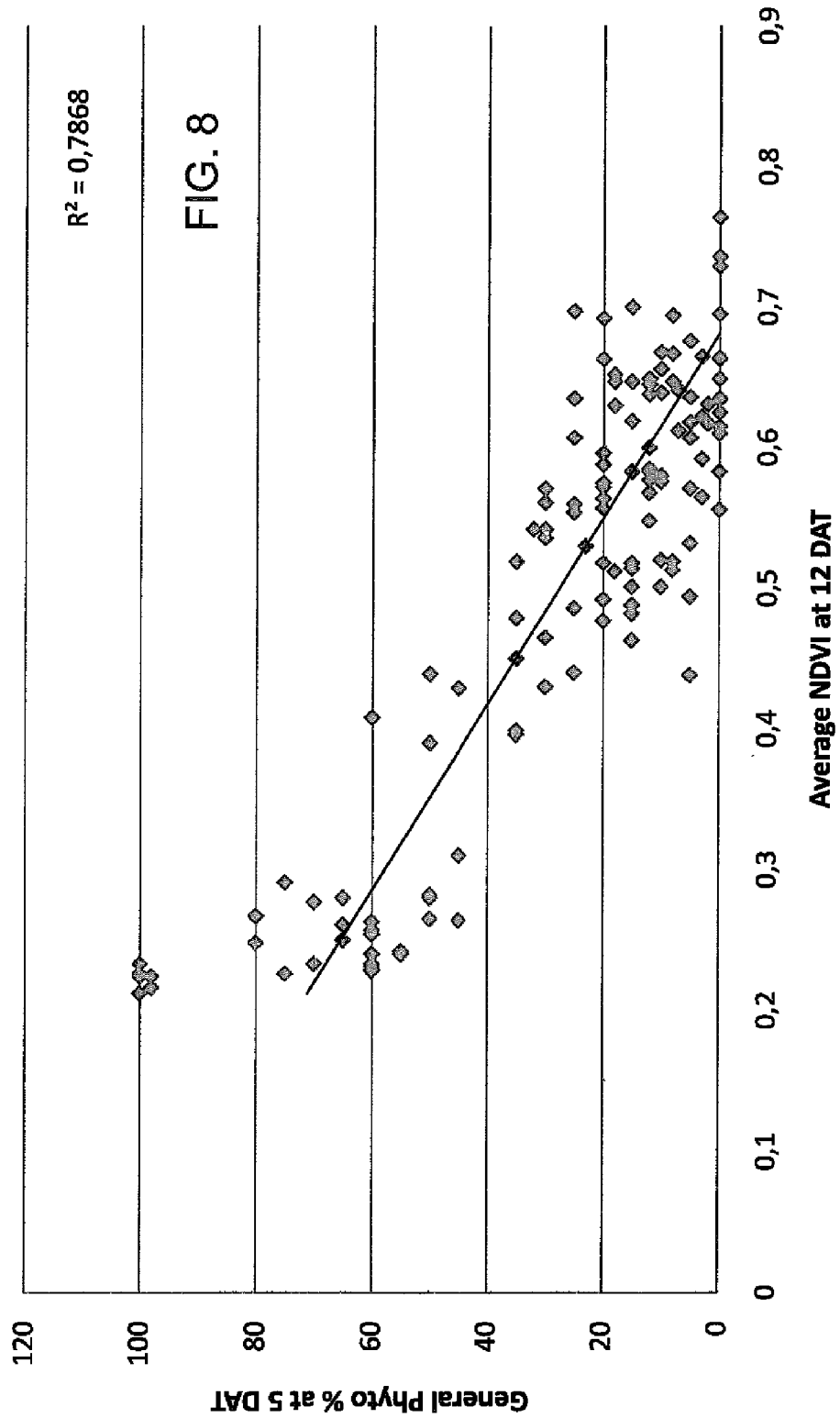

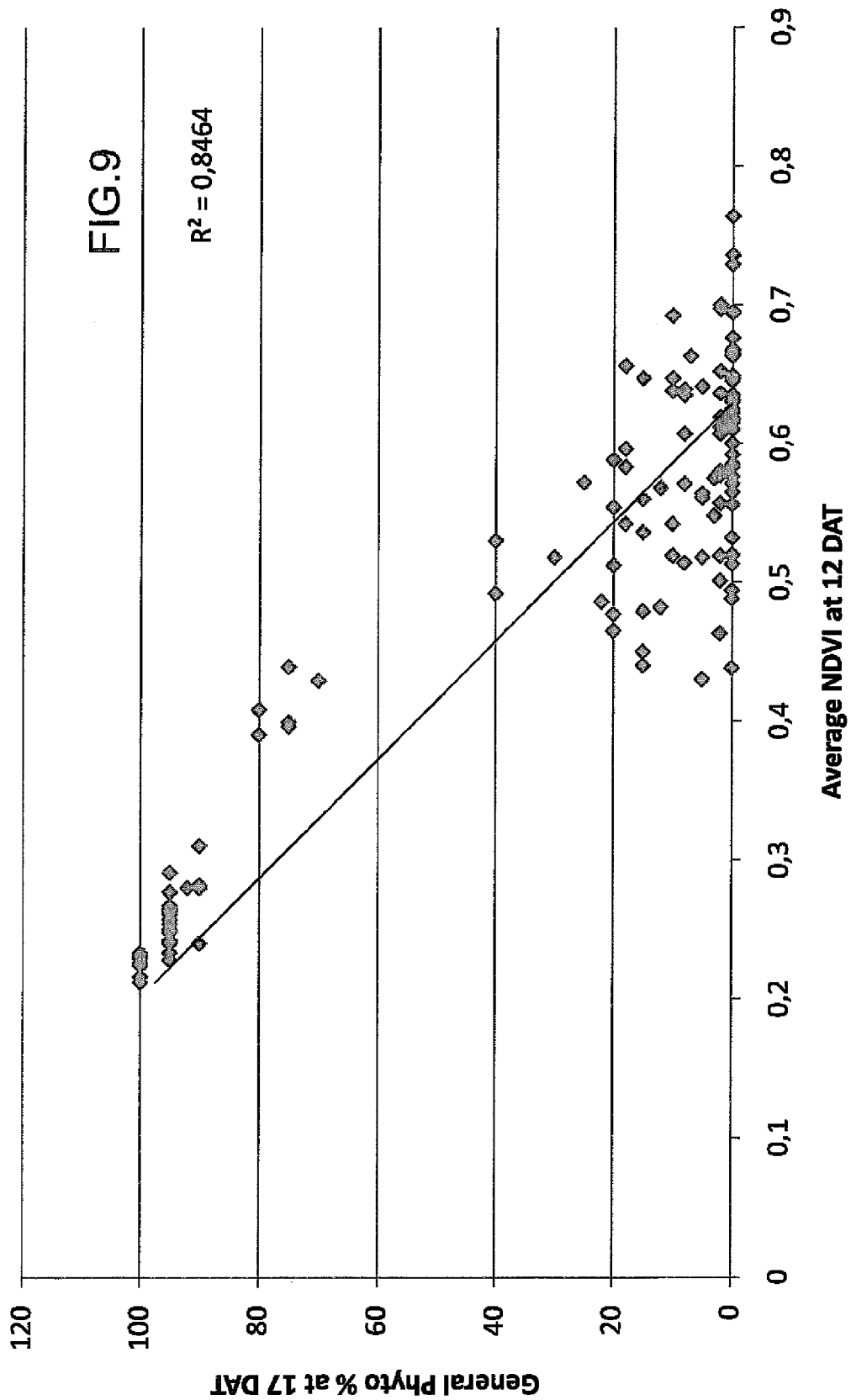

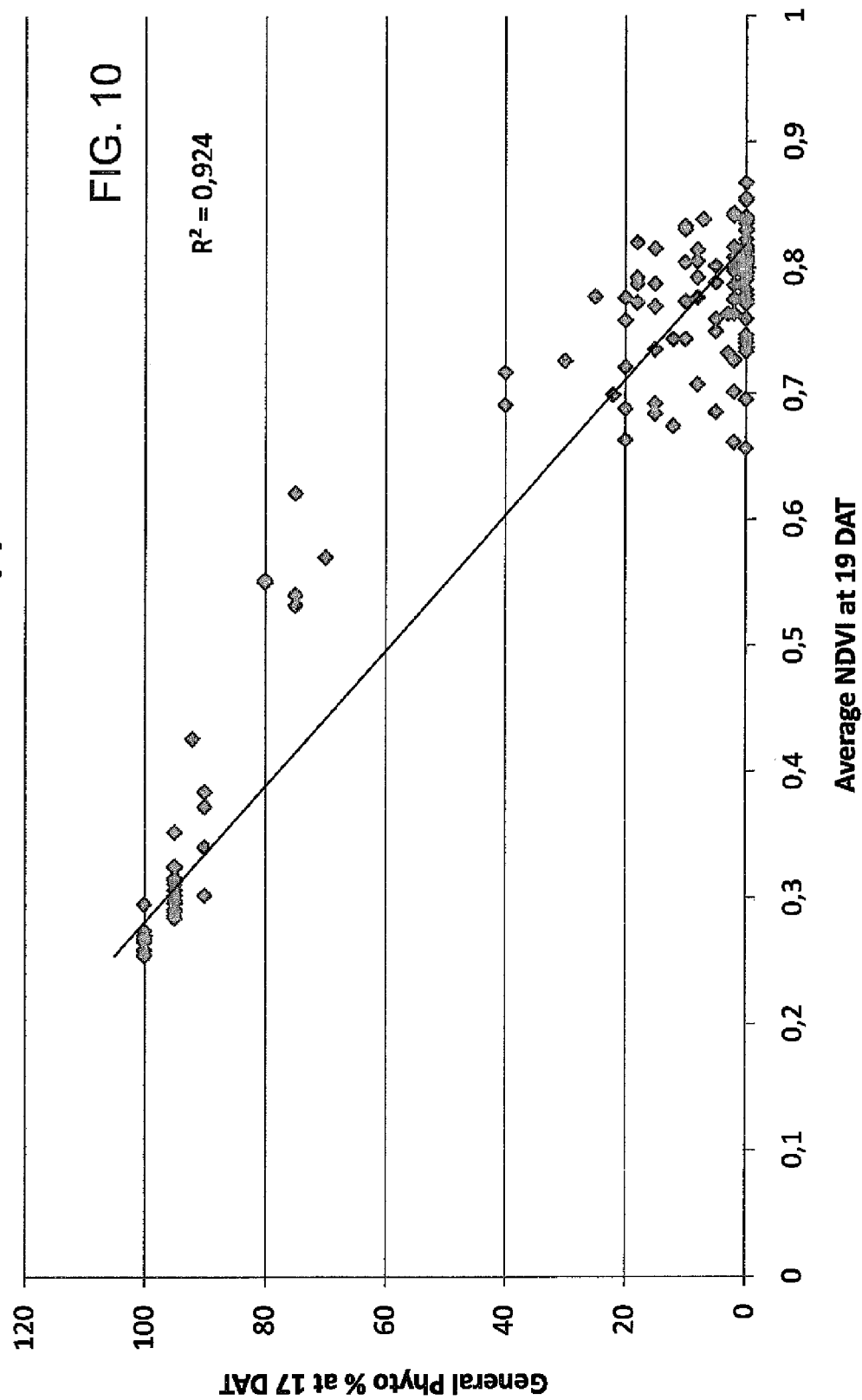

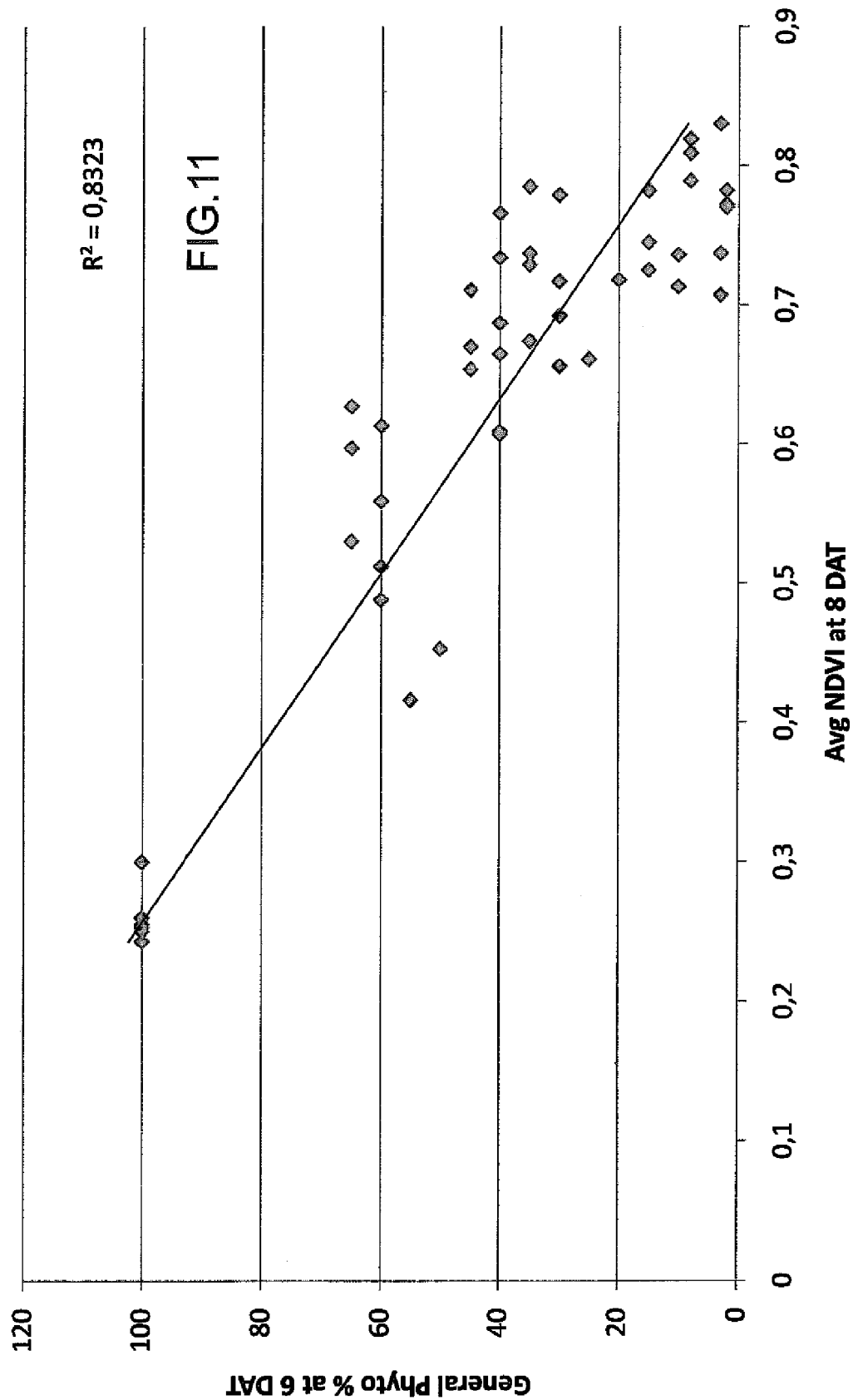

FIG. 16

AUTOMATED SYSTEM FOR ANALYZING PHYTOTOXICITY

This application is a 371 of International Application No. PCT/EP2011/052531 filed Feb. 21, 2011, which claims priority to U.S. Provisional Application Ser. No. 61/349,018 filed May 27, 2010, U.S. Provisional Application Ser. No. 61/373,471 filed Aug. 13, 2010, and Patent Cooperation Treaty International Patent Application Ser. No. PCT/US2010/046288 filed Aug. 23, 2010, the contents of which are incorporated herein by reference.

FIELD OF THE INVENTION

The present invention relates to a system for automated analysis of plant injury. More specifically, the invention relates to a field cart, a vehicle or a tool bar mobile attachment for a vehicle for use in an automated system for quickly and accurately measuring plant injury, or phytotoxicity caused by a pesticide or its formulary components, and also to methods of selecting or eliminating pesticides, or method selecting or eliminating plant selections based on the automated system.

BACKGROUND OF THE INVENTION

Agricultural small plot field research trials are designed to measure treatment effects on the plots. Plot treatment use common chemical application methods including, for example, foliar, soil, drench, in-furrow, and seed treatment. When the treatment is a chemical, like a pesticide (such as herbicide, insecticide, fungicide, nematicide, etc.) the measurement is usually taken to detect evidence of deleterious plant effects. Although in some cases, the chemical enhances the plant and the measurement detects an increased plant quality.

These measurements require extensive, and time consuming visual ratings of field plots for phytotoxicity or other plant injury such as stunted growth, poor stands or similar measurements. These ratings are then used in selecting plants with tolerance to a pesticide of interest or testing for screening pesticidal usefulness on plants. These field ratings are very time consuming and subjective even when persons with highly specialized skill sets are employed. Each plot must be rated for multiple components of herbicide injury, and each component is visually rated on a 0 to 100 scale. There is variability in ratings due to the interval of time required to rate numerous plots, and due to testing individuals' skill level and individual biases. If plot plant quality is compromised due to environmental conditions unrelated to the treatment, such as hail, disease, wind, then the plot results are not useful because the intended treatment cannot be accurately measured. Existing procedures require evaluation of plot phytotoxicity approximately four to thirty days after applications. Plants are counted or visually scored for plant injury and plant death. Plots not meeting minimum quality standards are noted for exclusion from further analysis. These ratings will range from early vegetative to reproductive growth stages. Multiple ratings allow for a more detailed understanding of the plant response to pesticide injury but existing manual procedures are costly, labor intensive and not always precise.

SUMMARY OF THE INVENTION

The invention comprises automated field scanning system used in plant breeding programs to automate evaluating the phytotoxicity and/or injury or death of plants, including specifically the evaluation of the phytotoxicity and/or injury of pesticide treated plants in a plant breeding program.

The invention comprises of a system and a field cart or a toolbar used in plant selection program to automate evaluating the phytotoxicity and/or injury or death of plants, including specifically the evaluation of the phytotoxicity and/or injury of plants in a program for selection of transformants, lead events, or plants with introgressed transgenes or traits. The invention comprises a system and automated field scanning used in a plant screening program to automate evaluating the phytotoxicity and/or injury or death of plants, including the evaluation of the phytotoxicity and/or injury of plants in a program for detection of silenced, switchable or lost traits which are detectable with a xenobiotic application in plants which putatively carry such transgenes or traits. The invention comprises a system and a field cart/toolbar which is used in chemical screening programs to automate evaluating the phytotoxicity and/or injury to plants or lack thereof in plants treated with different pesticides, mixture(s) of pesticides, rates of pesticide application, types of application of pesticides, different devices for pesticide application or any combination of these. In some cases the treatment my have beneficial effects on the plant. The present pesticide screening method uses the automated field scanning system to screen pesticides by the evaluation of the phytotoxicity and/or injury of plants in an automated pesticide screening program.

Broadly, the present invention comprises a system and an automated sensor tool used to automate evaluating the phytotoxicity and/or injury or death of plants in agricultural field. In a preferred embodiment, the invention comprises a system for automating the process of quantifying plant plot phytotoxicity in agricultural small plot field research trials. The system uses active radiometric sensors to measure canopy spectral reflectance per row expressed in NDVI units (normalized difference vegetation index). Vegetation readings are separated from soil readings and reported as percent vegetation coverage and average NDVI.

The system automates the process of screening thousands of experimental plants for plant phytotoxicity or injury. The system also automates the process of screening pesticides on thousands of plants for detection of plant phytotoxicity or injury. Typically, evaluating plant injury is a manual process that relies on several experienced technicians to make and record hundreds of evaluations per hour. This manual system uses a numerical rating system, for example from one to nine, where one equals optimum injury and nine equals plant death. Thousands of plots must be manually evaluated on a daily basis by multiple technicians. The evaluations are subjective because of differing biases and amount of experience of each technician. A technician can typically evaluate between 500 and 1000 plants per hour, or approximately 50 to 100 small research plots per hour.

In one embodiment, the invention provides a system for evaluating the injury of growing treated plants. The invention is used to evaluate the phytotoxicity and/or injury from pesticide treatment on the plants growing in a field. Apparatus for taking data regarding the phytotoxicity of the plants in the rows are mounted on a field cart for easy transport in the field. The field cart includes a body supported on wheels above the plant canopy. A radiometric sensor is mounted on the body of the cart and positioned so that it looks down on a row as the cart is moved through the field. The number of sensors corresponds to the number of rows of plants that are spanned by the cart so that each sensor is positioned above a row. As the cart is pushed down the plurality of rows, each sensor assembly collects data from the plants in the corresponding row and generates a data signal that is received and stored in a computer also mounted on the cart. Preferably, the position of each plant in each row of the field or range was recorded by GPS apparatus associated with a planter that planted the row and the field cart also includes GPS apparatus such that the data generated can be correlated with the recorded planting position and hence the identity of the seed planted at the location for use in a breeding program for developing improved varieties of plants.

Optionally, the field cart or vehicle may include a marking or elimination tool. As the data signal is generated, this signal can be compared with the data signals that are in a range of the result and determined to be within or outside of such result range. All data signals that indicate a plant which is selectable can be marked with an automated marking system. So the automated marker can mark plants that are desired or undesirable plants. The plants can be marked with a spray of color or paint, a tag. flag or label can be used to visually depict the plants. Alternatively, the plants can be eliminated with a targeted herbicide spray which is automatically activated by the system to correlate with the GPS position of the plant, or the plants can be cut, sheared or physically damaged by a mechanical device that is automated by the by the system to correlate with the GPS position of the plant which is not desired.

In another embodiment, the invention provides a method of evaluating a pesticide's propensity to have a phytotoxic effect or injure growing plants. The method includes planting a plurality of rowed plots in a field and positioning a mobile field cart above the growing plants. The field cart (which can be motorized, manually pushed or operated by pedal power) includes a body with at least one sensor secured to the body. Each sensor generates a data signal and a computer receives and stores the data signals. The method also includes the steps of positioning each sensor above a single row of plants, scanning each plant in each row, transmitting a data signal from each sensor to the computer, and storing the data signals in the computer. Other aspects of the invention will become apparent by consideration of the detailed description and accompanying drawings.

BRIEF DESCRIPTION OF THE DRAWINGS

FIG. 8 is a graph of the lead event trial—V2 Applications, the y axis showing the General Phyto percentages at 5 DAT (days after treatment) and the x axis showing the average NDVI at 12 DAT.

FIG. 9. is a graph of the lead event trial—V2 Applications, the y axis showing the General Phyto percentages at 17 DAT (days after treatment) and the x axis showing the average NDVI at 12 DAT.

FIG. 10 is a graph of the lead event trial—V2 Applications, the y axis showing the General Phyto percentages at 17 DAT (days after treatment) and the x axis showing the average NDVI at 19 DAT.

FIG. 11 is a graph of the lead event trial—V5 Applications, the y axis showing the General Phyto percentages at 6 DAT (days after treatment) and the x axis showing the average NDVI at 8 DAT.

FIG. 16 is a chart of field treatment applications on the lead event trials for pesticide resistant soybeans.

DETAILED DESCRIPTION OF PREFERRED EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The apparatus and methodologies described herein may make advantageous use of the Global Positioning Satellite (GPS) system to determine and record the positions of fields, plots within the fields and plants within the plots and to correlate collected plant condition data, to determine and record positions of specific plants, to determine and mark, flag or tag specific plants, to determine and dispatch specific plants. Although the various methods and apparatus will be described with particular reference to GPS satellites, it should be appreciated that the teachings are equally applicable to systems which utilize pseudolites or a combination of satellites and pseudolites. Pseudolites are ground- or near ground-based transmitters which broadcast a pseudorandom (PRN) code (similar to a GPS signal) modulated on an L-band (or other frequency) carrier signal, generally synchronized with GPS time. Each transmitter may be assigned a unique PRN code so as to permit identification by a remote receiver. The term "satellite", as used herein, is intended to include pseudolites or equivalents of pseudolites, and the term GPS signals, as used herein, is intended to include GPS-like signals from pseudolites or equivalents of pseudolites.

It should be further appreciated that the methods and apparatus of the present invention are equally applicable for use with the GLONASS and other satellite-based positioning systems. The GLONASS system differs from the GPS system in that the emissions from different satellites are differentiated from one another by utilizing slightly different carrier frequencies, rather than utilizing different pseudorandom codes. As used herein and in the claims which follow, the term GPS should be read as indicating the United States Global Positioning System as well as the GLONASS system and other satellite- and/or pseudolite-based positioning systems.

Figure 1:
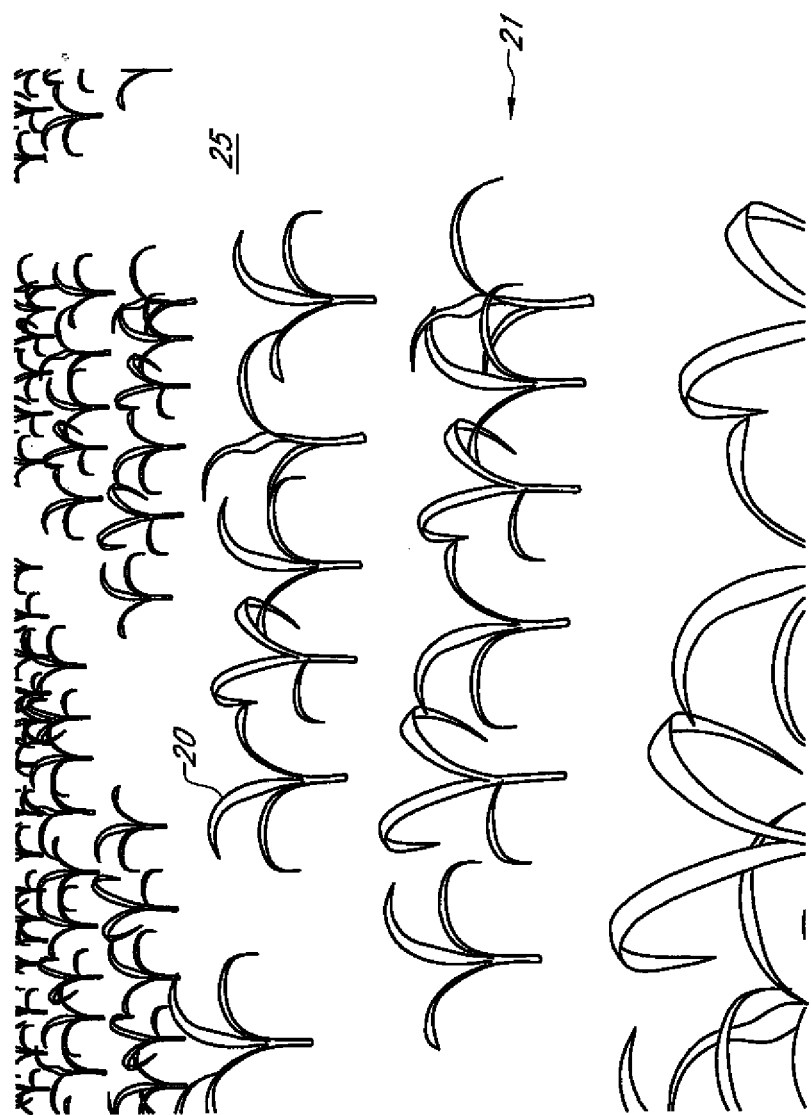
FIG. 1 is a perspective view of a corn field.

FIG. 1 illustrates an agricultural field 25 which has been planted in accordance with the methods described herein. A planter equipped with a high-precision GPS receiver results in the development of a digital map of the agricultural field 25. The map defined through this operation may become the base map and/or may become a control feature for a machine guidance and/or control system to be discussed in further detail below. The map should be of sufficient resolution so that the precise location of a vehicle within the area defined by the map can be determined to a few inches with reference to the map. Currently available GPS receivers, for example as the ProPak®-V3 produced by NovAtel Inc. (Calgary, Alberta, Canada) are capable of such operations.

For the operation, a tractor or other vehicle is used to tow a planter across the field 25. The planter is fitted with a GPS receiver which receives transmissions from GPS satellites and a reference station. Also on-board the planter is a monitoring apparatus which records the position of seeds as they are planted by the planter. In other words, using precise positioning information provided by the GPS receiver and an input provided by the planter, the monitoring apparatus records the location at which each seed is deposited by the planter in the field 25.

As the tractor and planter proceed across field 25 to plant various rows of seeds, seedlings or crops, a digital map is established wherein the location of each seed planted in field 25 is stored. Such a map or other data structure which provides similar information may be produced on-the-fly as planting operations are taking place. Alternatively, the map may make use of a previously developed map (e.g., one or more maps produced from earlier planting operations, etc.). In such a case, the previously stored map may be updated to reflect the position of the newly planted seeds. Indeed, in one embodiment a previously stored map is used to determine the proper location for the planting of the seeds/crops.

In such an embodiment, relevant information stored in a database, for example the location of irrigation systems and/or the previous planting locations of other crops, may be used to determine the location at which the new crops/seeds should be planted. This information is provided to the planter (e.g., in the form of radio telemetry data, stored data, etc.) and is used to control the seeding operation. As the planter (e.g., using a conventional general purpose programmable microprocessor executing suitable software or a dedicated system located thereon) recognizes that a planting point is reached (e.g., as the planter passes over a position in field 25 where it has been determined that a seed should be planted), an onboard control system activates a seed planting mechanism to deposit the seed. The determination as to when to make this planting is made according to a comparison of the planter's present position as provided by the GPS receiver and the seeding information from the database. For example, the planting information may be accessible through an index which is determined according to the planter's current position (i.e., a position-dependent data structure). Thus, given the planter's current location, a look-up table or other data structure can be accessed to determine whether a seed should be planted or not.

In cases where the seeding operation is used to establish the digital map, the seeding data need not be recorded locally at the planter. Instead, the data may be transmitted from the planter to some remote recording facility (e.g., a crop research station facility or other central or remote workstation location) at which the data may be recorded on suitable media. The overall goal, at the end of the seeding operation, is to have a digital map which includes the precise position (e.g., to within a few inches) of the location of each seed planted. As indicated, mapping with the GPS technology is one means of obtaining the desired degree of accuracy.

Figure 2:
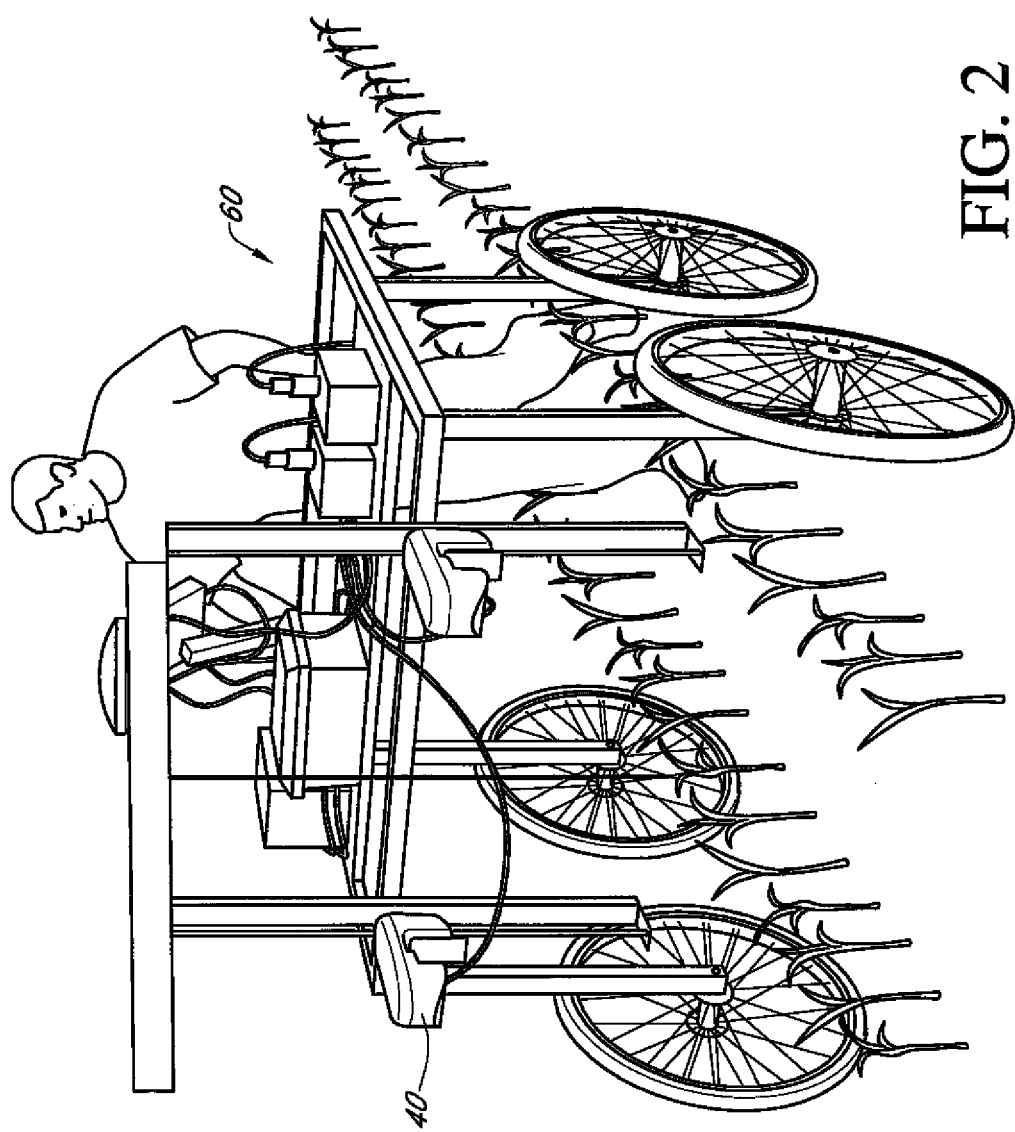
FIG. 2 is a perspective view of a wheeled cart supporting apparatus included in the present invention shown spanning two rows of corn in a field.
Figure 3:
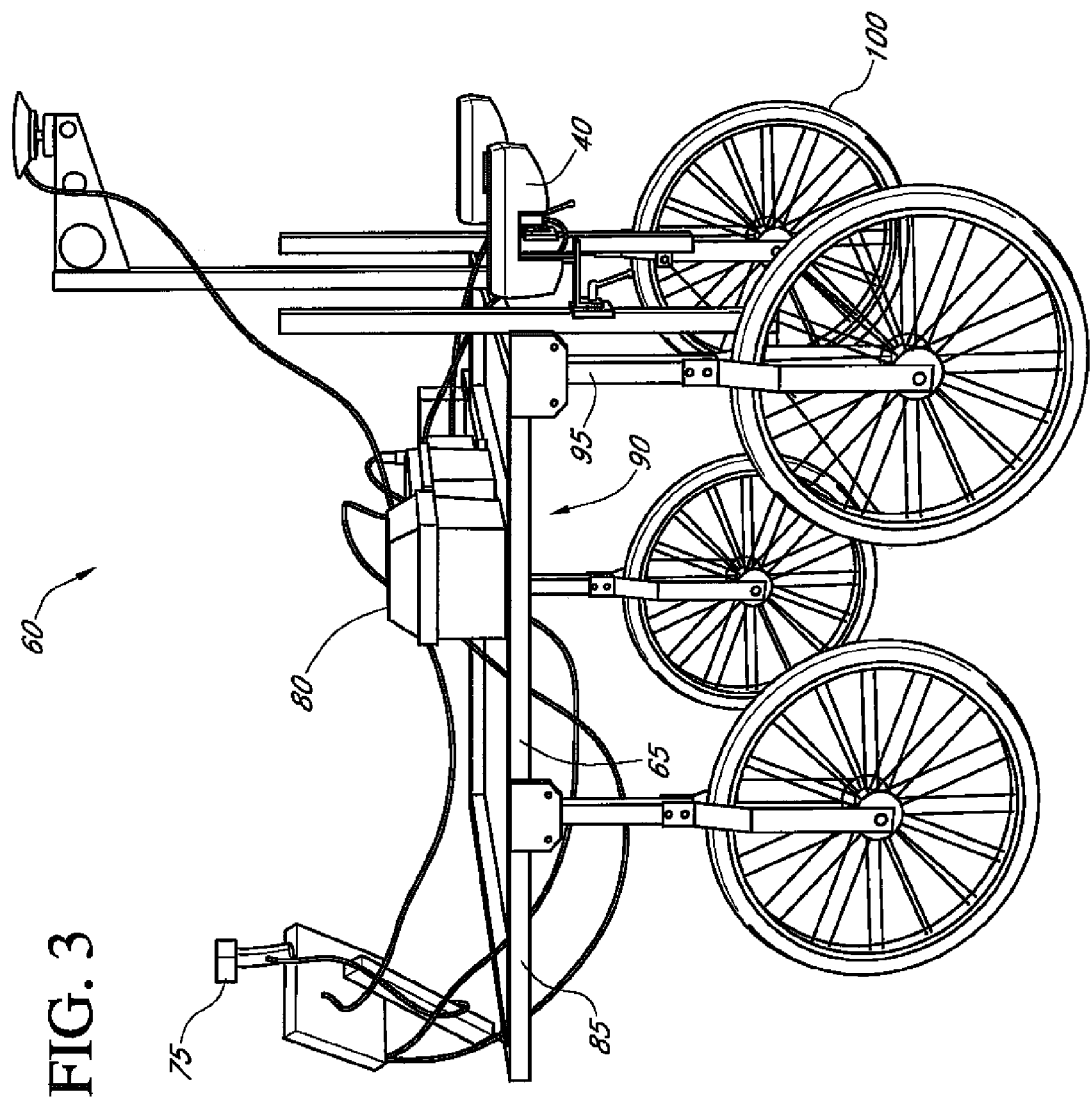
FIGS. 3-5 are additional perspective views of the cart.
Figure 4:
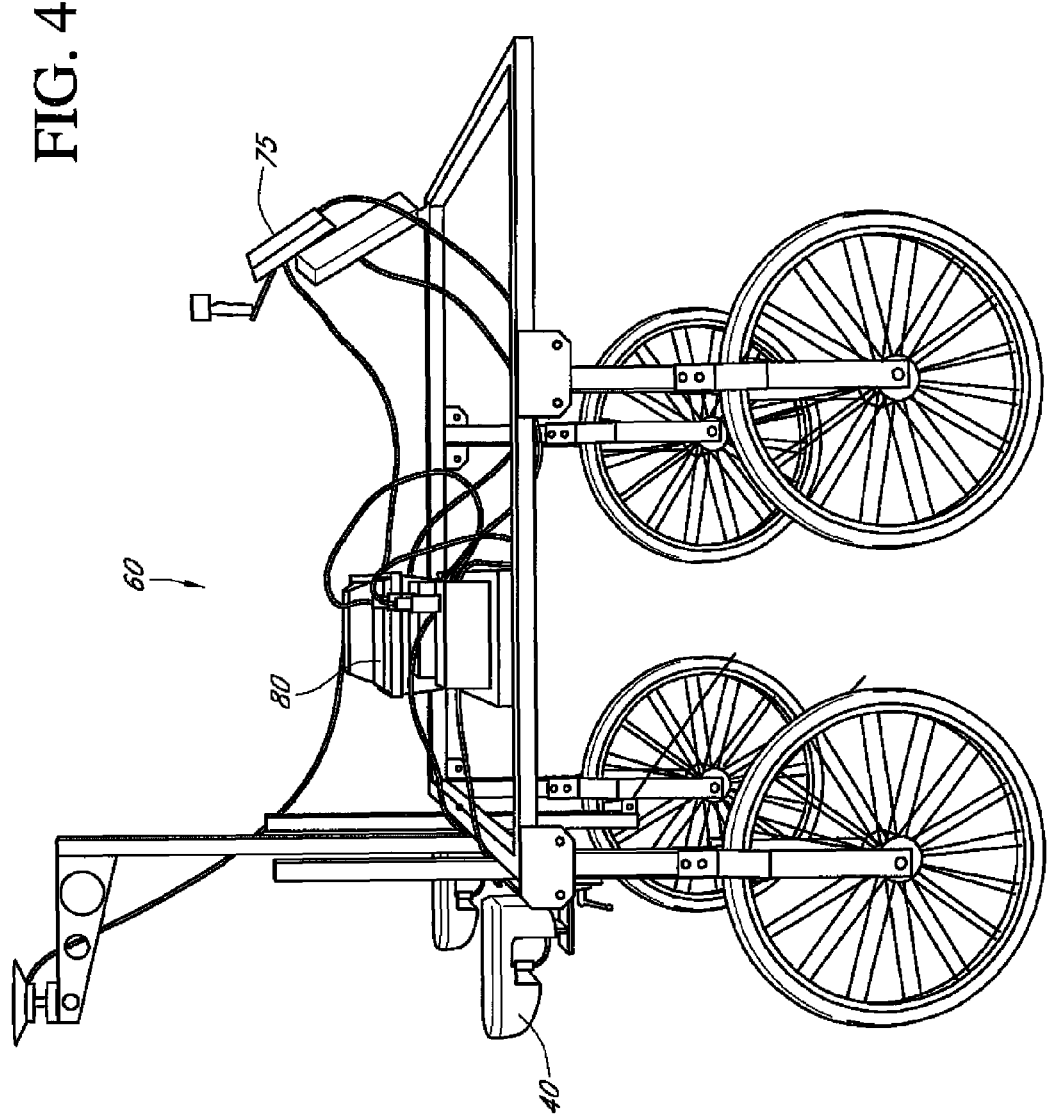
Figure 5:
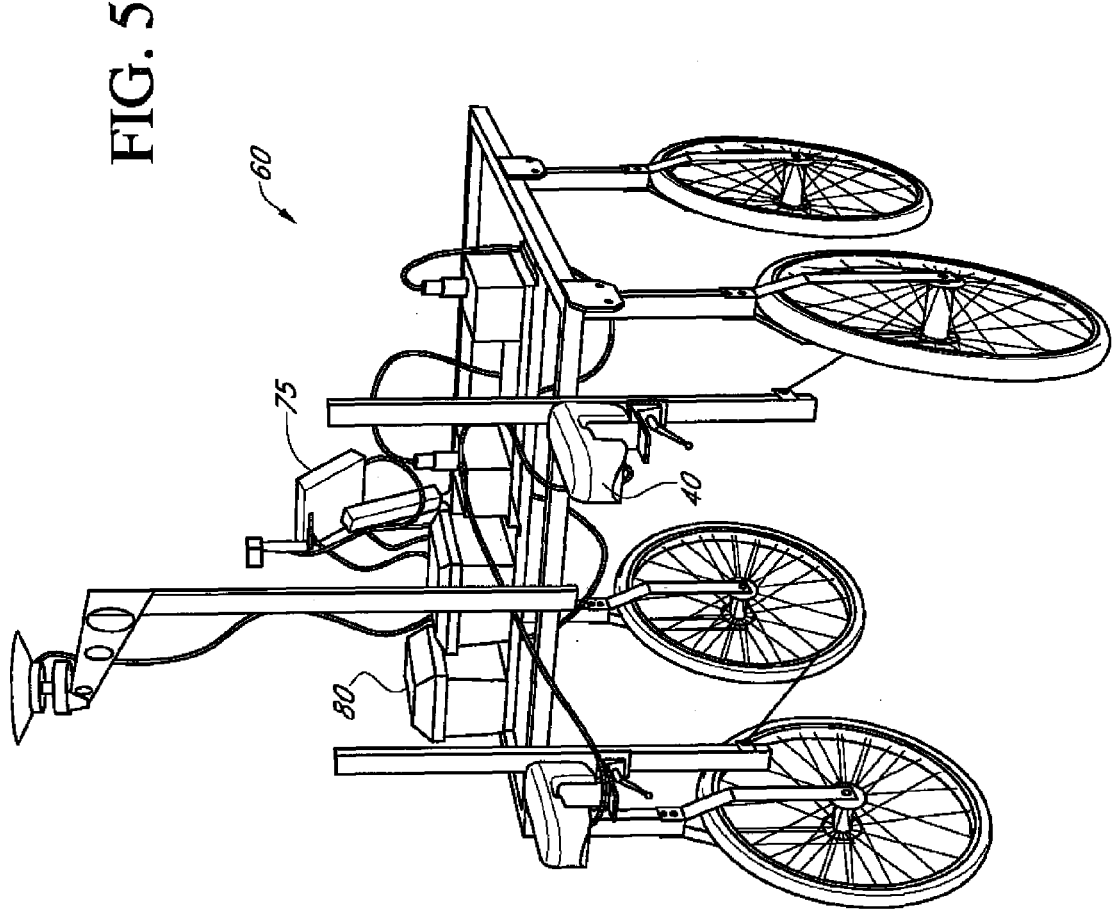
Figure 6:
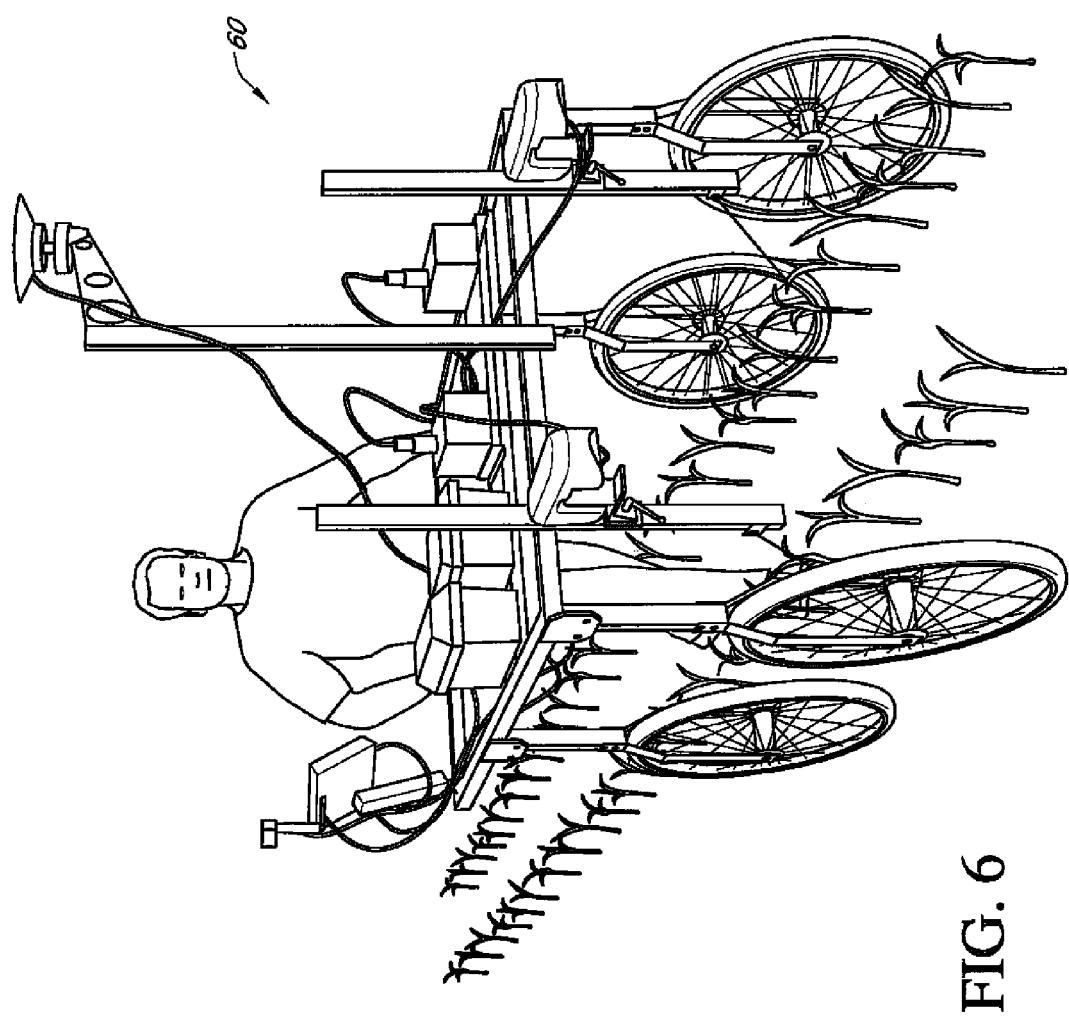
FIG. 6 is another perspective view of the cart shown in corn in a field.

As shown in FIGS. 1 and 2, the field 25 is planted with a plurality of rows 21 of plants, which in this embodiment are corn plants.

Different varieties of plants may be planted in the field 25 as part of a pesticide testing or plant breeding or plant selection program to evaluate the phytotoxicity and/or injury of the different varieties after treatment of the field. For example, the field 25 may be planted with varieties such as sweet corn, soybean, cotton, peanuts, potatoes, canola, wheat, alfalfa, sugar beets, sunflower, rice, sorghum, vegetables, fruits and berries. Plant determination programs such as a breeding program, traited plant selection, a transformant selection, lead event trials or transgenic event selection programs may be set up to determine varieties that are resistant, tolerant, or susceptible to a pesticide treatment. Treatment application methods comprise, for example, foliar, soil, drench, in-furrow, and seed treatment. The treatment is a chemical, like a pesticide such as a herbicide, insecticide, fungicide, nematicide, it can also include herbicide adjuvants, safeners, and the like. The pesticide treatment of these fields can be combined with a wide range of environmental conditions. This allows the automated plant determination programs to evaluate the effects of the pesticide treatment in various genetic by environmental (G×E interactions) plant situations. For example, the pesticide treatment can be applied to a field with soil with a high pH which is planted with control varieties that are not stressed and varieties that are stressed by elevated pH in the soil to determine the treatments effect on stressed varieties. Of course plant resistance, tolerance or susceptibility to the pesticide treatment across a wide range of conditions including: soil types, pH, weather, temperature, disease, pest, water, and nutrient pressures, can be evaluated as will be readily apparent to one of skill in the art. Additionally pesticide treatments tendency to produce plant injury when plants are growing in such diverse conditions like soil types, weather, temperature, disease, pest, water, pH, and nutrient pressures, can be evaluated as will be readily apparent to one of skill in the art.

The apparatus and methodologies described herein utilize radiometric crop sensor assemblies 40 that measure the reflectance and absorbance of one or more frequencies of light by plant tissues. There are two types of radiometric sensor assemblies 40, active sensor assemblies which use one or more internal light sources to illuminate the plants being evaluated, and passive sensor assemblies which use ambient light only. One suitable index in assessing crop conditions is the normalized difference vegetative index (NDVI). The NDVI was developed during early use of satellites to detect living plants remotely from outer space. The index is defined as $NDVI=(NIR-R)/(NIR+R)$ where NIR is the reflectance in the near infrared range and R is the reflectance in the red range but other visual frequencies can be substituted for red. In some embodiments the sensors for use with the present invention generate an output that is in NDVI units.

As shown in FIGS. 2-6, a sensor assembly 40 is the GreenSeeker® RT100 sold by NTech Industries (Ukiah, Calif.), now a part of Trimble Navigation Limited (Sunnyvale, Calif.). In other embodiments, passive sensor assemblies that utilize ambient light are used.

Figure 7A:
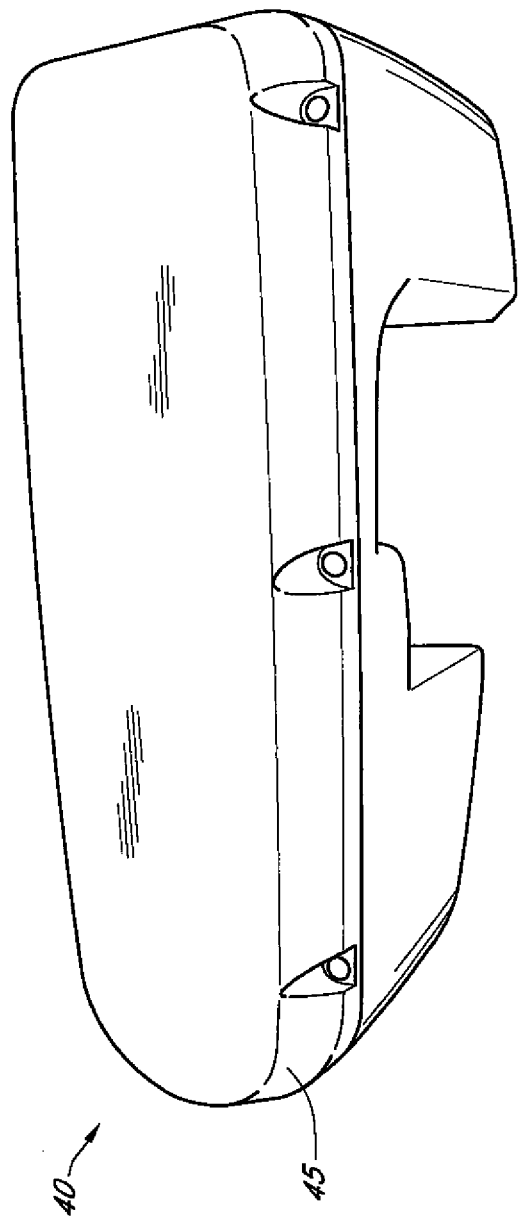
FIG. 7 is a photograph of a sensor used in a system.
Figure 7B:
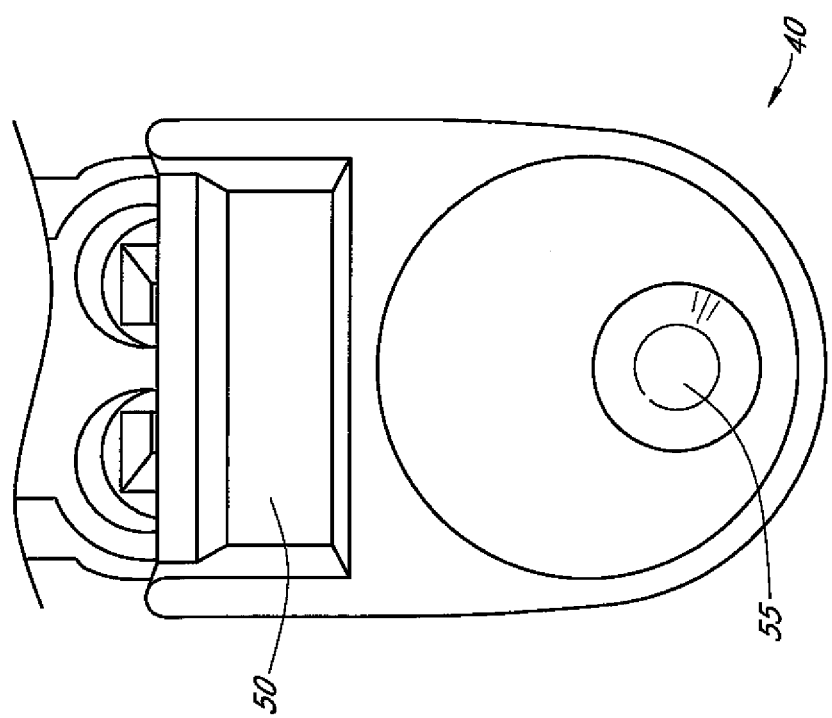

As shown in FIG. 7, a radiometric sensor assembly 40 includes a casing 45, a light source 50 mounted in the casing 45, and a sensor 55 mounted in the casing 45. In some embodiments, the sensor assembly 40 includes a sensor module including the light source 50 and the sensor 55 and a control box electrically connected to the sensor module. In other embodiments, the sensor assembly 40 includes multiple sensors 55 and multiple light sources 50. As explained above, the sensor 55 is configured to measure the reflectance and absorbance of one or more frequencies of light by plant tissues and generate an output in NDVI units.

As shown in FIGS. 2-6, a field cart 60 includes a body 65, a pair of sensors 40 mounted to the body 65, a computer 75, and a power supply 80. The body 65 includes a substantially rectangular frame 85 supporting a workspace 90. The body 65 also includes four legs 95, each of the legs 95 extending substantially perpendicularly from the frame 85. A wheel 100 is mounted to each leg 95 opposite from the frame 85. The four wheels 100 are grouped as two front wheels and two rear wheels and as two right-side wheels and two left-side wheels. Optionally, the cart can be motorized, powered like a bicycle or rickshaw, pushed or pulled manually or with another vehicle.

Each sensor 40 is secured to the field cart 60. Each sensor 40 is electrically connected to the computer 75 and is powered by the power supply 80. In a preferred embodiment, the light source 50 transmits a narrow band of red and infrared light modulated at 50 ms. with the sensor 55 configured to take twenty readings per second.

Figure 13:
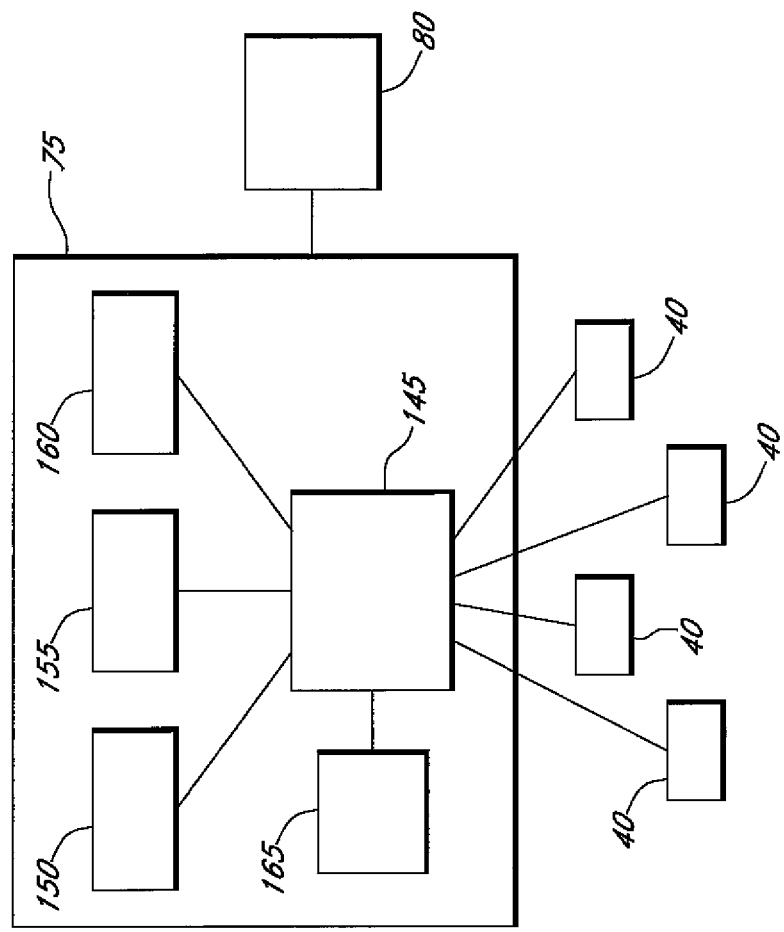
FIG. 13 is a schematic diagram of some of the electrical components of a system of the present invention.

As shown in FIG. 13, the computer 75 includes a processor 145, a memory unit 150 electrically connected to the processor 145, a user interface 155 electrically connected to the processor 145, a display 160 electrically connected to the processor 145, and a GPS system 165 electrically connected to processor 145. The GPS system 165 can be a stand-alone component or physically integrated with the computer 75. The sensors assemblies 40 are electrically connected to the processor 145. The computer 75 is electrically connected to the power supply 80. A computer software program is used to calibrate, control and record data of the evaluation. The computer 75 is supported on the workspace 90. Alternatively, a GPS system 165 is not included in the computer 75.

The technician uses the field cart 60 to scan a section of two rows. More sensors could be added to scan more rows, or larger carts can be readily adapted to scan more rows. During a scan, each sensor assembly 40 measures the reflectance and absorbance of one or more frequencies of light from a plant 20, if any, present in the row section in NDVI units. NDVI values are on a continuous numeric scale between negative one to positive one, where a high number indicates a plant 20 with normal growth and a low number indicates a plant 20 that is adversely affected by the treatment conditions. The measured NDVI values therefore represent the injury of the plant 20 evaluated in the row section. The ability to make precise inferences is improved by using a continuous scale compared to the indexed numerical scale used with manual evaluation. The sensors 40 are calibrated to a known standard and provide consistent readings across an experimental field 25, thus reducing or eliminating the subjective variation across multiple technicians and the range-to-range, day-to-day variation of each technician. In a preferred embodiment, the row sections can vary in length but are five feet in this example. Since the sensor 40 takes a reading every 50 ms, the number of readings or measurements taken in the five foot row section obviously depends on the speed the technician pushes the cart 60, but will typically be between 28 and 34 measurements. The average NDVI of the vegetation in the plot including soil is recorded, thus giving an objective evaluation of the phytotoxicity of the stand of plants in each plot.

A field 25 is planted using multiple varieties of a selected crop according to a planned experiment, preferably using a planter that was equipped with a GPS device such that the location of each plant 20 is recorded together with the identity of the variety of seed planted in the corresponding location. The planting location and identity data is loaded into the computer 75. The computer program is used, together with the GPS system 165 to record the data gathered by the sensor assemblies 40 and associate that data with the location and identity data.

As shown in FIG. 2, a technician pushes the field cart 60 along the rows 21 such that a plurality of row sections of each of the two rows 21 pass between the left-side wheels 100 and the right-side wheels 100. The technician positions the field cart 60 so that the sensors 40 are positioned one each above a corresponding one of the two rows. The technician then triggers the sensor assemblies 40 to scan. The scan is triggered with the computer program by the user interface 155 and then the cart 60 is pushed by the technician down the two rows 21. Alternatively, the scan can be triggered using a switch, a button, or other known methods of generating an electrical signal. Approximately thirty-five hundred row sections can be screened in an hour using this automated method, more can be done with the mechanization of the movement of cart associated with the sensors. Compared to manual methods, the automated system is more objective and data collection at least two times faster.

When using a computer 75 without a GPS system 165, the technician manually verifies the location of field cart 60 at the start of a group of rows 21. When the field 25 is planted, a stake is placed in the ground at the start of a group of rows 21. A second stake is placed in the ground at a predetermined forward location. Each stake includes an individual identifier, for example a number or barcode. As the technician pushes the field cart 60 along the group of rows 21, the technician uses the stakes to verify the actual position of the field cart 60 compared to the expected location of the cart as determined by the computer program. For example, at the beginning of a group of rows 21, the computer program prompts the technician to verify the position of the field cart 60 using the stake at the beginning of the group of rows 21. Next, the technician inputs the identifier associated with the stake and positions the field cart 60 above the first two row sections. Then, the technician triggers a scan. The computer program stores the data from the scan of the first two row sections and associates that data with the planned experiment. Then, the computer program automatically indexes to the next row sections as the cart is advanced by the technician. As the cart 60 nears the second stake, the computer program prompts the technician to verify the position of the field cart 60 using the second stake. In this manner, the position of the field cart 60 in the field 25 is tracked to ensure that the computer program is correctly associating the data collected by the sensor assemblies 40 with the preplanned experiment. The technician can use the computer program to monitor his position along the group of rows 21 relative to the stakes. If the field cart 60 is not in the expected position when the technician is prompted, the technician can use the computer 75 and computer program to correct the error or to identify the ranges 35 that were incorrectly associated with the planned experiment. Alternatively, a barcode reader or a radio tag, scanner (for example, an IFRD tag scanner) can be located on the field cart and positioned to read the identifier associated with the stake. This reading of the identifier can then automatically trigger the scan. And the data from the scan is associated with the data from the planned experiment and/or from the GPS system. In another embodiment with a more automated system in the field the data collected by the sensor assemblies 40 and the GPS data are merged and the processed in association with the GIS mask which is made from the planter information. This GIS mask filters the merged sensor data and GPS data to summarize data by plot or in some embodiments by plant. The pedigrees and other agronomic plant information about the plants within each plot is associated with a barcode or other tagging system where in the summarized plot data can be associated with the pedigree data and stored.

When using a computer 75 including a GPS system 165, the location of each row section of plants is automatically determined by the GPS system 165 and the data from the sensor assemblies 40 is automatically associated with planned experiment after a scan is preformed. Alternatively, the GPS system 165 determines the location of each row section and the computer program automatically indexes to the next row section after a scan.

Figure 14A:
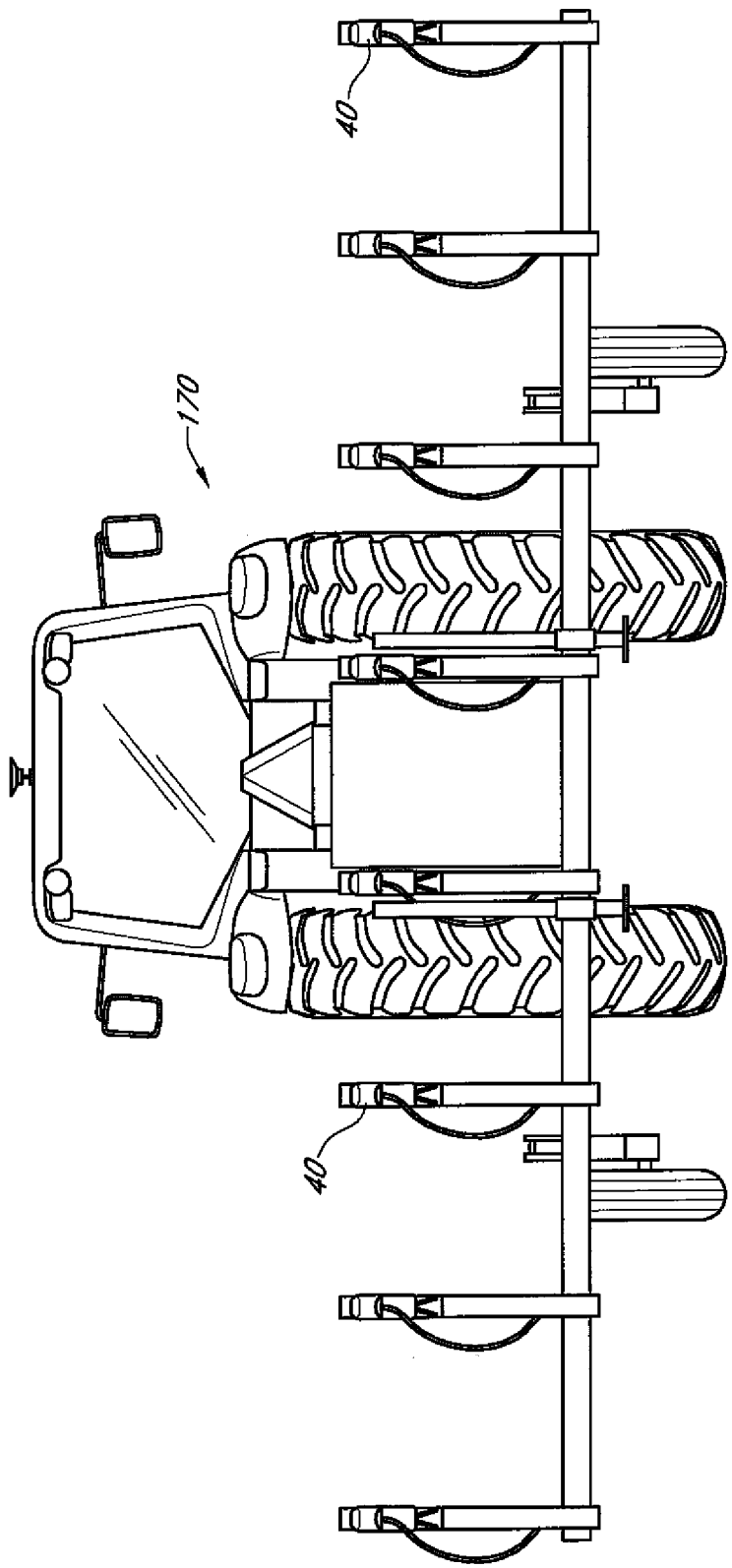
FIGS. 14 a-c are photographs of a tractor-mounted embodiment of the present invention.
Figure 14B:
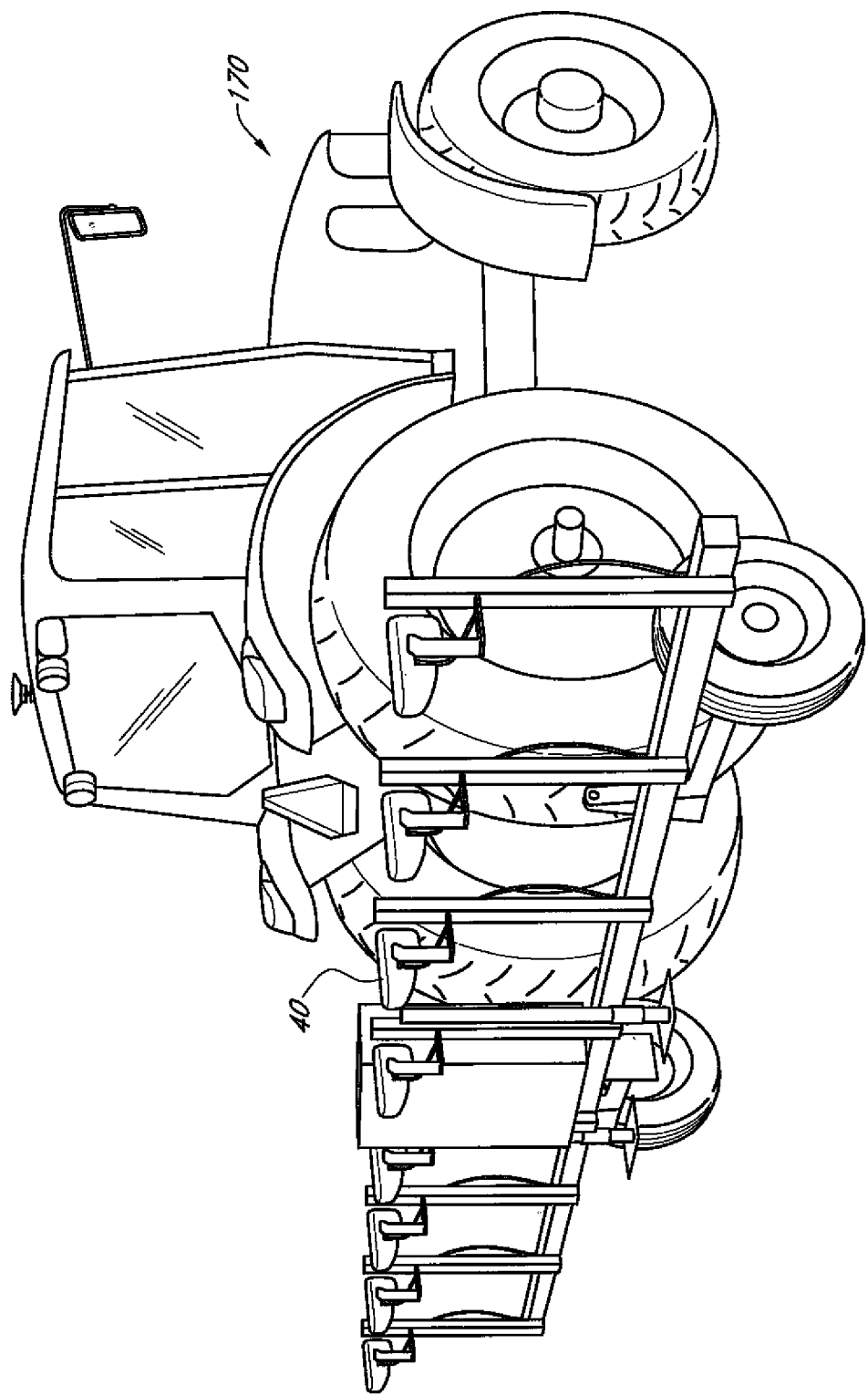
Figure 14C:
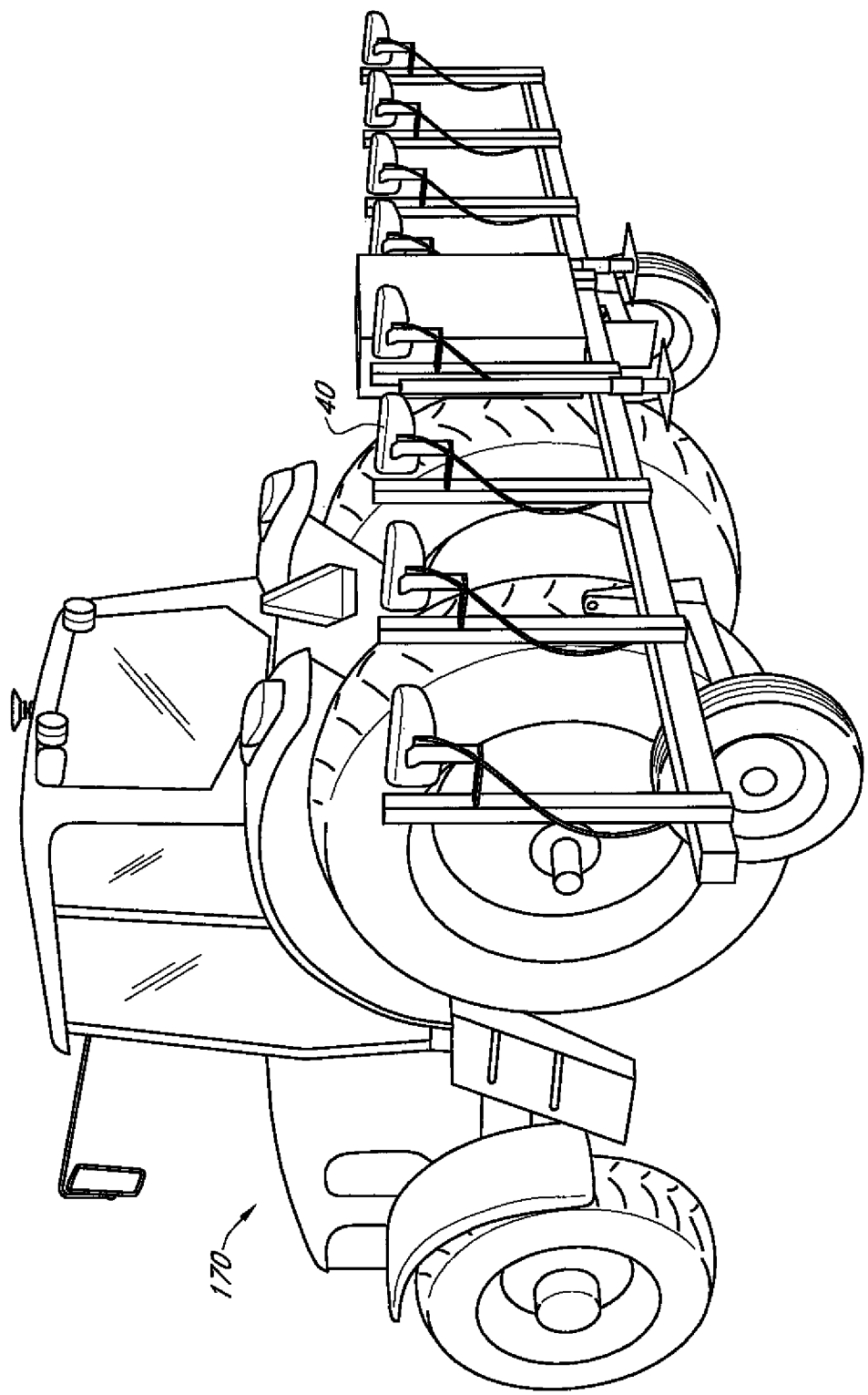

Alternatively, this field cart can be mobilized by addition of a motor, or it can be pulled behind a vehicle such as a truck, tractor, all wheel terrain vehicle, a mower, etc. An embodiment wherein eight sensors 40 are mounted on the toolbar of a tractor 170 is illustrated in FIGS. 14 a-c. Of course, the control components, including, for example, the computer 75 and GPS system 165 are also included in the tractor-mounted embodiment. The tractor-mounted embodiment, accordingly, is capable of taking measurements of one-eight rows simultaneously. The field cart and the toolbar embodiments are an automated field scanning system.

In operation the invention comprises a system and a field cart used in plant breeding programs to automate evaluating the phytotoxicity and/or injury or death of plants, including specifically the evaluation of the phytotoxicity and/or injury of plants in a plant breeding program.

The invention also comprises another method of use for this system and a field cart. One method of use for this automated field scanning system is for plant selection wherein the plants are selected from pesticide treated locations. Another use for this automated field scanning system is for screening pesticides for plant effects.

In each method of use the field scanning system automates the evaluation of the phytotoxicity and/or injury or death of pesticide treated plants. When the method is for plant selection the evaluation of the phytotoxicity and/or injury of the plants allows for the selection of desirable plants or the elimination of undesirable plants. These plants are often traited plants, for example, transformants, plants with introgressed transgenes, plants with different transgenic events, or combinations of transgenes, plants with mutation(s), or plants with native traits and any combination of these. If the plants can be selected based on evaluation of the phytotoxicity and/or injury or death of pesticide treated plants then they can be used in the method of this invention.

Another method of use of this system and a field cart is in a plant elimination program. The field scanning system automates the evaluation of the phytotoxicity and/or injury of plants in a program for detection of silenced, switchable or lost traits which are detectable with a xenobiotic application in plants which putatively carry such transgenes or traits. If the plants can be selected based on evaluation of the phytotoxicity and/or injury or death of pesticide treated plants then they can be used in the method of this invention.

Yet a further method of use of this system is in a chemical screening program wherein the evaluation of the phytotoxicity and/or injury of the pesticide treated plants allow for the screening of chemicals. This pesticide screening method uses the field scanning system, which automates the evaluation of the phytotoxicity and/or injury of plants treated with pesticides. In this method of use for pesticide screening or selection, different treatments protocols can be used in the program; for example, the treatment of the plants can be with different pesticides, mixtures of pesticides, different rates or timing of application of pesticides, different formulations of pesticides, different method of applying the pesticides. These treated plants are scanned by the sensors to generate data with which to evaluate the phytotoxicity and/or injury of plants in this automated pesticide screening program.

A field 25 is planted using multiple varieties of a selected crop or alternatively with only one variety of a selected crop according to a planned experiment, preferably using a planter that was equipped with a GPS device. The GPS device records the planting location in latitude, longitude and experiment range, row coordinates. The planting location data is recorded into the computer 75. The planting location is treated with the pesticide treatment. Each pesticide treatment is assigned to a specific planting location. The computer program is used, together with the GPS system 165 to record the data gathered by the sensor assemblies 40. After sensor data is collected it is associated by the computer 75 with the previously collected planting location and identity data to generate a report of sensor data by specific variety and or pesticide treatment.

Example One

Evaluation of Plant Injury of Herbicide Resistant Soybean Plants

An experiment was designed to evaluate a new method of use of the system to measure the tolerance of soybean plants to various herbicide treatments and timings. A field was planted with a plurality of rows of soybeans and each of the rows was divided into a plurality of row sections. Each of the row sections was planted with soybean seed of a preselected one of the varieties.

A herbicide bicyclopyrone is a HPPD inhibiting herbicide with intended use in monocot crops, such as corn. Bicyclopyrone is the compound represented by the formula A10+B52 as presented in U.S. Pat. No. 6,838,564. The U.S. Pat. No. 6,838,564 is hereby incorporated by reference. This herbicide has known residual activity in the soil of the field. In crop rotations the next season plant is often a soybean. Soybeans that are HPPD resistant are herbicide resistant lines. The residual activity associated with HPPD-inhibiting herbicides can cause damage to soybean lines without tolerance, direct application of herbicide can be lethal. This experiment was designed to determine the effect of various pesticides on HPPD resistant soybeans. This experiment provides a mechanism to select either events or pesticides for application that pose little to no risk when applied to such soybeans, in the same field during subsequent growing seasons.

The following treatments were applied to individual plots for testing.

Treatments, 1-Untreated, 2-Callisto 840 gai/ha@ Pre, 3-Balance Pro 420 gai/ha@ Pre, 4-Callisto 420 gai/ha+Balance Pro 210 gai/ha@ Pre, 5-Callisto 105 gai/ha+Induce 0.25% v/v AMS 2.5% v/v@V2, 6-Callisto 210 gai/ha+Induce 0.25% v/v AMS 2.5% v/v@V2, 7-Callisto 420 gai/ha,+Induce 0.25% v/v AMS 2.5% v/v@V2, 8-Balance Pro 140 gai/ha+Induce 0.25% v/v AMS 2.5% v/v@V2, 9-Balance Pro 280 gai/ha+Induce 0.25% v/v AMS 2.5% v/v@V2, 10-Callisto 105 gai/ha+Balance Pro 70 gai/ha I Induce 0.25% v/v AMS 2.5% v/v@V2, 11-Laudis 184 gai/ha+Induce 0.25% v/v AMS 2.5% v/v@V2, 12-Callisto 105 gai/ha+Laudis 92 gai/ha+Induce 0.25% v/v AMS 2.5% v/v@V2, 13-Impact 150 gai/ha+Induce 0.25% v/v AMS 2.5% v/v@V2, 14-Callisto 210 gai/ha+Ignite 900 gai/ha+AMS 2.5% v/v@V2, 15-Ingite 900 gai/ha+AMS 2.5% v/v@V2 fb Ignite 900, gai/ha+AMS 2.5% v/v@V5, 16.-Callisto 210 gai/ha+Induce 0.25% v/v+AMS 2.5% v/v@V5, 17-Callisto 420 gai/ha+Induce 0.25% v/v+AMS 2.5% v/v@V5, 18-Balance Pro 140 gai/ha+Induce 0.25% v/v+AMS 2.5% v/v@V5

Brand Name: AI
Callisto: Mesotrione (HPPD)
Balance Pro: Isoxaflutole (HPPD)
Impact: Topramezone (HPPD)
Laudis: Tembotrione (HPPD)
Ignite: Glufosinate
Gluphosinate is not classified as an HPPD inhibitor.
"Induce" is an herbicide adjuvant.

The method for use of the present method of use of the automated field scanning system permitted these pesticide selections or the event selection to be made based on automated data collection.

Figure 16:
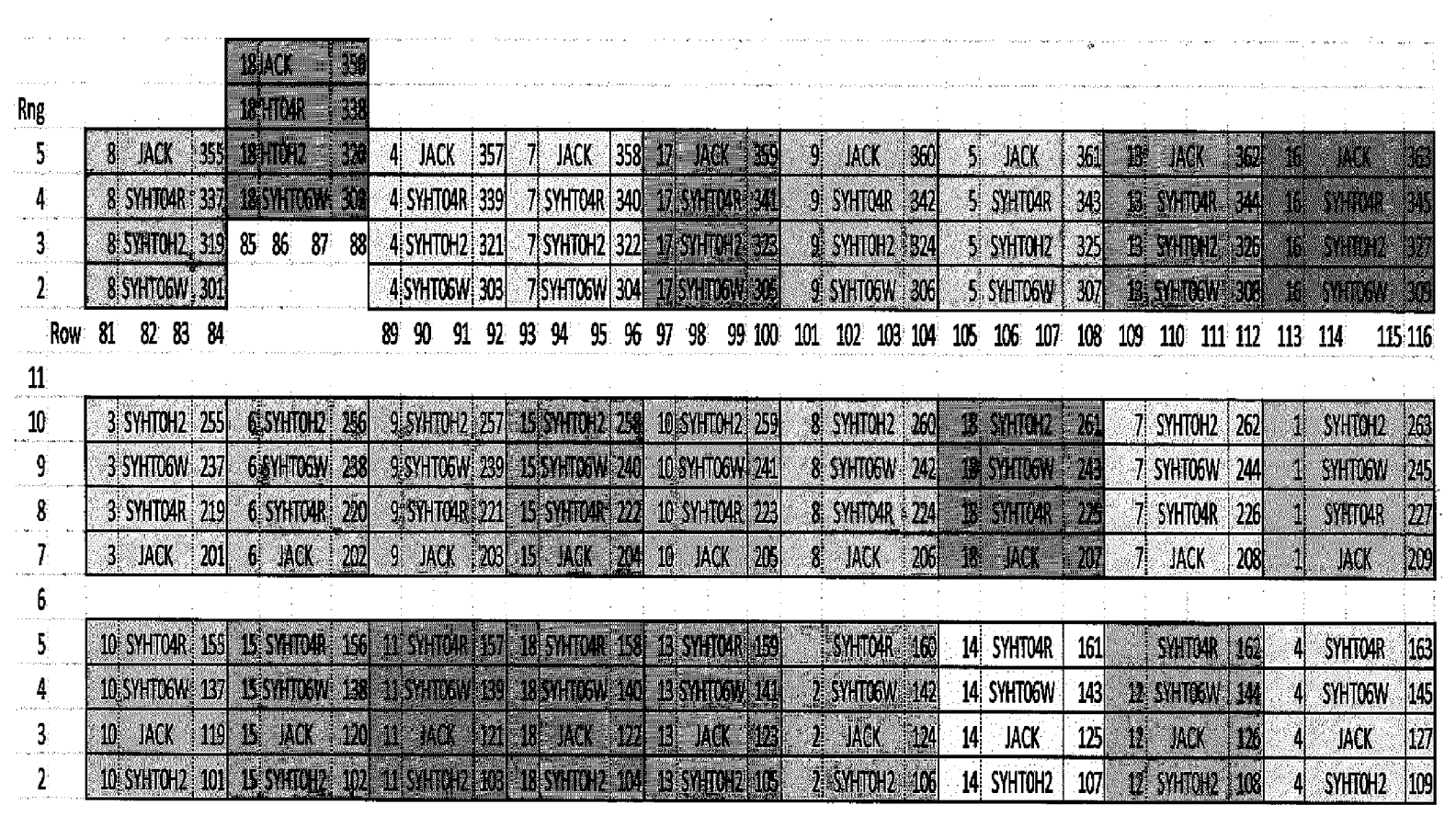

In FIG. 16, a representative sample of the experimental design of the locations of the soybean plants are shown in the row sections. The graphs the average NDVI value which included soil if present was used to detect the tolerance of each row section to a specific herbicide treatment.

When selecting genetically modified soybean events with tolerance to an herbicide of interest, visual rating of field plots for herbicide injury requires a highly specialized skill set and is very time consuming Each plot must be rated for multiple components of herbicide injury, and each component is visually rated on a 0 to 100 scale. There is variability in ratings between individuals based on skill level and individual biases.

As is shown in FIGS. 8-11 remote sensing data (NDVI) was collected at 2 DAT and 16 DAT from the V2 (V2 stands for $2^{nd}$ fully expanded leaf and V5 (when used) stands for $5^{th}$ fully expanded leaf) applications. Crop Protection ratings were collected at 4 and 16 DAT from the V2 applications. Overall phyto and chlorosis ratings were taken by highly specialized technician.

Figure 12:
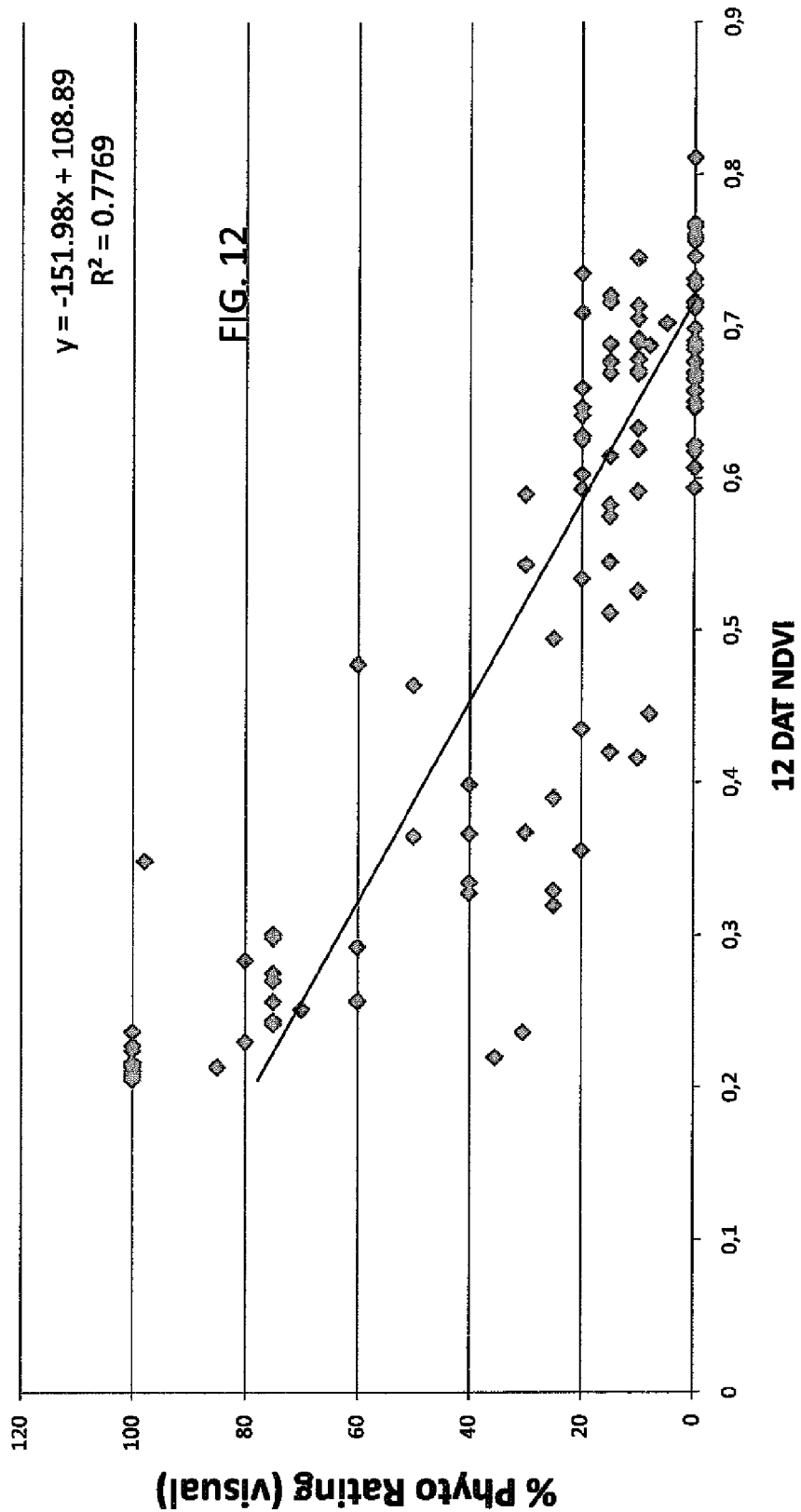
FIG. 12 is a graph of trial SG051 showing correlation of 12 DAT NDVI and 16 DAT phyto.
Figure 15:
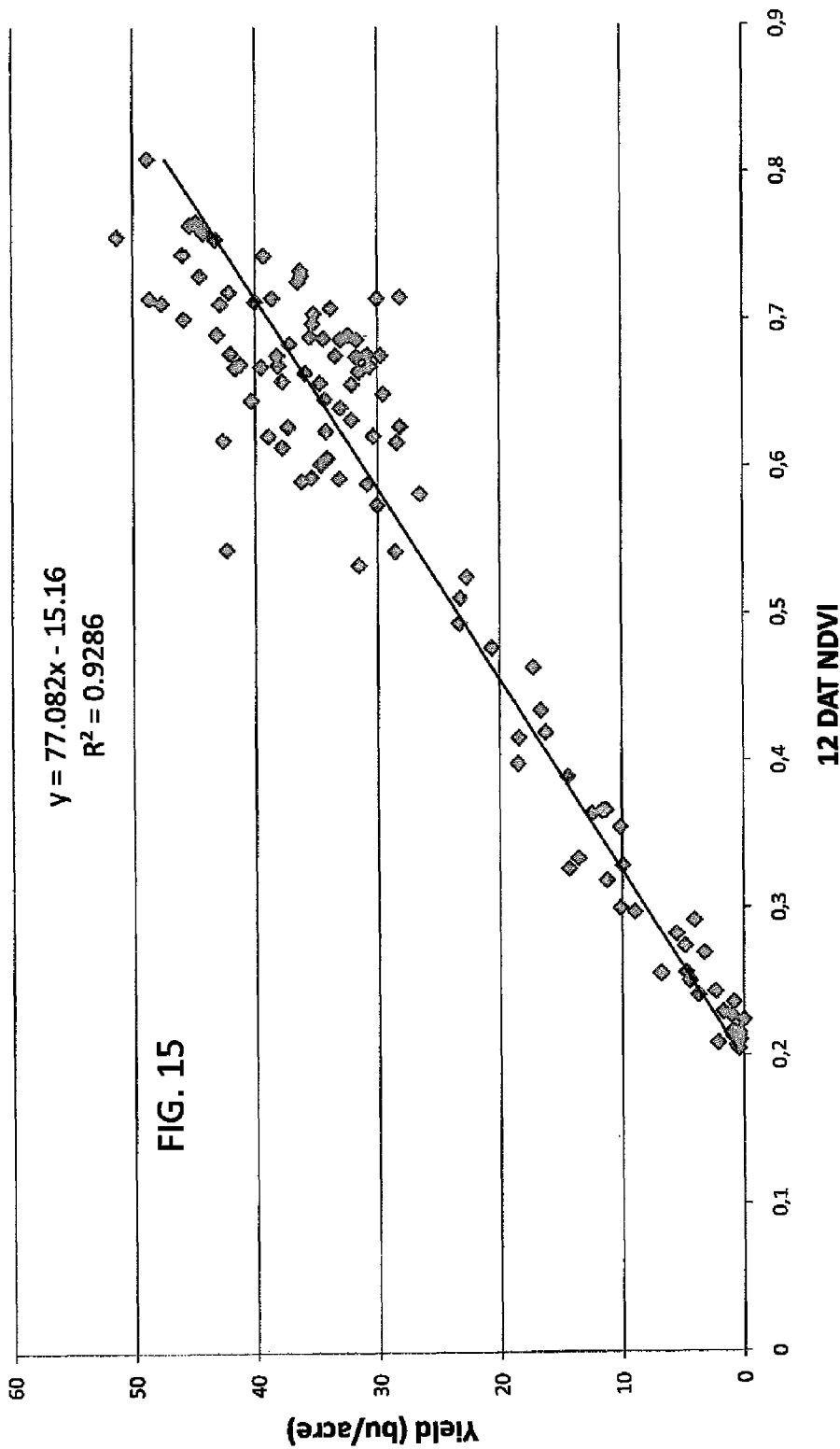
FIG. 15 is a graph of trial SG051 showing correlation of 12 DAT NDVI and Yield.

In this trial the NDVI was taken at 12 DAT. As is shown in FIGS. 12 and 15 this data was predictive of overall phytotoxicity of plants, especially at 16 DAT and of yield. The correlations between 2 DAT NDVI and 4 DAT visual ratings were poorer than the correlation between 12 DAT NDVI and 16 DAT visual ratings because there was significant change in plant injury from 2 to 4 days. This experiment required that automated NDVI ratings and the manual visual ratings for plant injury be taken on the same day, to best evaluate the usefulness of the automated technology.

The plants phytotoxicity evidenced less change in plant injury between day 12 and 16. This plant injury stability lead to a better correlation between visual and automated data collection at the later timing.

The correlation results which allowed automated collection to be used for plant selection are shown in FIGS. 8-11. An automated system also greatly increases the speed with which ratings can be recorded and allows for someone not skilled in the art of accessing herbicide injury to take the automated ratings. Ratings can be taken at multiple time points after herbicide application, generally from four to thirty days after applications. These ratings will range from early vegetative to early reproductive growth stages. Multiple ratings allow for a more detailed understanding of the plant response to herbicide injury.

Plots with the most resistance to an herbicide of interest have uniformly high NDVI values (0.6 or higher), while plots with poorer herbicide resistance have uniformly lower NDVI values (0.4 or lower). The change in NDVI values over time provides information on how quickly a given plot is recovering from the herbicide application. High NDVI values at the time of herbicide injury are also correlated to the end of season yield of the plots being evaluated. For example, 12 days after treatment, trial SG051 NDVI values of 0.4 equated to 18 bu/ac compared to an NDVI reading of 0.6 to 0.8 which equaled 30 to 50 bu.ac. at the end of the season.

Example Two

Vegetation Indices Used to Measure Plant Condition

Ratios of specific wavelengths of reflected light correlate with the condition of the plant. NDVI (Normalized Difference Vegetation Index) is the most common one of many available indices to measure plant condition by remote sensing. NDVI can be defined as:

$$NDVI = (NIR - V)/(NIR + V) * 100$$

NIR, near infrared=760–900 nm (cellular structure and mass)

V=visual, green 500–600 nm or red 600–700 nm (Photosynthetically active radiation)

Vales from −1 to 1

Low values=non vegetation

Highest values=robust vegetation

Plots with the most resistance to an herbicide of interest have uniformly high NDVI values, while plots with poorer herbicide resistance have uniformly lower NDVI values. The change in NDVI values over time provides information on how quickly a given plot is recovering from the herbicide application. High NDVI values at the time of herbicide injury are also correlated to the end of season yield of the plots being evaluated.

This is a method of pesticide treated plant selection, comprising the steps of: planting seed of a selected variety of the plant in a row section and recording the position of the row section; growing the pesticide treated plants to a selected stage for evaluation of phytotoxicity and/or injury; collecting radiometric sensor data from each row section corresponding to the phytotoxicity and/or injury plants in the row section; analyzing the sensor data to generate a measure of the phytotoxicity and/or injury of the variety of plant in the row section; and using the measure of phytotoxicity and/or injury of the variety as a basis for selecting amongst plants. This selection can be part of a plant breeding program, an event selection trial, a traited plant trial, a trait introgression selection or a yield selection program. Once the plants are selected then there is the harvesting seed from the selected variety or progeny evidencing the desired plant injury measurements which correlates with the yield. The harvested seed can be further bred with or grown to form progeny plants from harvested seed. These plants should carry the selected trait or event associated with the pesticide treatment. These traits or events can then be further introduced through marker selected breeding, traditional breeding, haploid/doubled haploid breeding into new plant germplasm.

Example Three

The system of the present invention will be used in an experiment designed to evaluate the tolerance of corn to cold temperatures at early growth stages namely at emergence and V3-V4 leaf stage. Data will be collected on plant emergence, plant vigor and plant growth.

Example Four

Seed treatments protect seeds, seedlings, and whole plants which can result in better plant stand and more vigorous plants. Rating these factors can be somewhat subjective and time-consuming The invention will be used to analyze plant vigor in seed treatment field trials. Specifically, the automated system will be used to evaluate emergence, early seedling growth, and seedling vigor in an unbiased manner Currently plant vigor ratings are recorded by visual observation of the whole plot using a 0 to 100% scale (0% equals dead plants and 100% equals the plot with the highest level of plant vigor). For the percent vigor rating, scientists visually inspect all plots within a replication and assign a value of 100% to the plot with the highest level of plant vigor. All other plots are rated relative to this plot. This visual rating system is a subjective overall rating and the data are difficult to analyze. The present invention will help us collect quantitative and objective data for individual plants.

Direct damage from pests is also commonly rated in seed treatment trials. Currently, the proportion of damaged plants within a given area are assessed by rating the total number of plants and also rating the total number of damaged plants within that area. This is a quantitative rating but it is time-consuming and only a limited area can be assessed. This invention will provide the opportunity to rate a larger area which will increase precision.

What is claimed is:

1. A system for evaluating the phytotoxicity and/or injury of plants, comprising:
   (a) a vegetative sensing apparatus for generating a data signal comprising sensor data corresponding to evidence of the phytotoxicity and/or injury of a plant, said plant having been subjected to a pesticide treatment;
   (b) a scanning system for transporting the sensing apparatus over a section of plants;
   (c) a location determining apparatus on the scanning system to generate location information of the vegetative sensing apparatus, said generated location information being configured for correlating the data signal to a section in which said plant is growing;
   (d) a computer arranged for:
      receiving and storing the data signal associated with phytotoxicity and/or injury of said plants;
      loading a correlation between a planting location, and an identity of a plant at the planting location into said computer;
      associating the sensor data with the planting location and the plant identity using the generated location information.

2. The system of claim 1, wherein the vegetative sensing apparatus comprises a radiometric crop sensor assembly for measuring reflectance and absorbance of one or more frequencies of light by plant tissue.

3. The system of claim 2, wherein a sensor of the radiometric crop sensor assembly is configured to generate an output in normalized difference vegetative index (NDVI) units.

4. The system of claim 3, wherein said plants are growing in a row sections and wherein the radiometric crop sensor assembly comprises a plurality of sensors positioned such that during operation each sensor is positioned above a different row.

5. The system of claim 1, wherein the location determining apparatus includes a global positioning satellite (GPS) system.

6. The system of claim 1, further comprising a marking tool for marking plants that are desired or undesired plants, wherein the system is configured to compare the generated data signal with a data signal range to determine whether the generated data signal corresponds to the desired or undesired plant, the system being further configured to automatically control the marking tool in accordance with an outcome of said comparison.

7. The system of claim 1, further comprising an elimination tool for cutting, shearing, physically damaging, or applying a herbicide to a plant, wherein the system is configured to compare the generated data signal with a data signal range to determine whether the generated data signal corresponds to a desired or undesired plant, the system being further configured to automatically control the elimination tool in accordance with an outcome of said comparison.

8. The system according to claim 1, wherein the system is implemented in a field cart, a vehicle, or a toolbar mobile attachment for a vehicle.

9. The system according to claim 1, wherein the computer is further arranged to generate a report of sensor data by specific plant variety and/or pesticide treatment.

10. A method of pesticide treated plant selection, comprising the steps of:
   (a) planting seeds, seedlings, or crops of a selected variety of a plant in a row section;
   (b) recording the position of said row section and correlating planting location and identity of the planted seeds, seedlings or crops;
   (c) applying a pesticide treatment at the planting locations;
   (d) growing the pesticide treated plants to a selected stage for evaluation of phytotoxicity and/or injury;
   (f) using the system of claim 1 for collecting sensor data from each row section, for generating a measure of the phytotoxicity and/or injury of the plants in the row section, said system being provided with the correlation between the planting locations and the identity of the plants at those planting locations; and
   (f) using the evaluated phytotoxicity and/or injury of the plants as a basis for selecting amongst the plants.

11. The method of claim 10, comprising using GPS for said recording of the planting positions.

12. The method of claim 10, wherein varieties of plants of untreated plants are included as check plants.

13. The method of claim 10, wherein said selecting is a part of a plant breeding program, an event selection trial, a traited plant trial, a trait introgression selection.

14. The method of plant selection according to claim 10, further comprising harvesting seed from the selected variety or progeny evidencing the desired plant injury measurements.

15. The method of plant selection according to claim 14, further comprising growing and progeny plants from said harvested seed wherein said plants carry said selected trait event.

* * * * *